(12) United States Patent
Su (10) Patent No.: US 11,131,879 B2
(45) Date of Patent: Sep. 28, 2021

(54) BACKLIGHT MODULE AND APPLICATIONS THEREOF

(71) Applicant: Qisda Corporation, Taoyuan (TW)

(72) Inventor: Chih-Chieh Su, Taoyuan (TW)

(73) Assignee: QISDA CORPORATION, Taoyuan (TW)

( * ) Notice: Subject to any disclaimer, the term of this patent is extended or adjusted under 35 U.S.C. 154(b) by 0 days.

(21) Appl. No.: 17/114,370

(22) Filed: Dec. 7, 2020

(65) Prior Publication Data

US 2021/0181550 A1 Jun. 17, 2021

(30) Foreign Application Priority Data

Dec. 17, 2019 (CN) .......................... 201911298543.5

(51) Int. Cl.
*G02F 1/13357* (2006.01)
*F21V 8/00* (2006.01)
*G02F 1/1335* (2006.01)

(52) U.S. Cl.
CPC ......... *G02F 1/1336* (2013.01); *G02B 6/0026* (2013.01); *G02B 6/0031* (2013.01); *G02F 1/133614* (2021.01)

(58) Field of Classification Search
CPC ............... G02B 6/0026; G02B 6/0023; G02F 1/133614; G02F 1/133609
USPC .................................................. 362/97.2, 84
See application file for complete search history.

(56) References Cited

U.S. PATENT DOCUMENTS

| | | | |
|---|---|---|---|
| 9,464,769 B2 | 10/2016 | Ninan et al. | |
| 2017/0023721 A1* | 1/2017 | Miki | G02B 6/0023 |
| 2018/0156961 A1* | 6/2018 | Miki | G02B 6/0026 |

FOREIGN PATENT DOCUMENTS

| | | |
|---|---|---|
| TW | 201241536 A | 10/2012 |
| WO | 2015051557 A1 | 4/2015 |

OTHER PUBLICATIONS

Office action of counterpart application by Taiwan IP Office dated Jun. 24, 2020.

* cited by examiner

*Primary Examiner* — Karabi Guharay (57) ABSTRACT

A backlight module includes a light-transmitting shell, a first light-emitting device, a first light conversion layer and an LGP. The light-transmitting shell includes a first top plate and a first sidewall. The first top plate connects to the first sidewall and two collectively make a non-180° angle, so as to define a first light-mixing space. The first light-emitting device is disposed in the first light-mixing space to provide a first color light. The first light conversion layer is disposed on the first top plate to convert the first color light to a second color light. The LGP has a light incident surface and a light exit surface, the first top plate is disposed between the light incident surface and the first light-emitting device, and the second color light comes into the light guide plate from the light incident surface and is emitted outwards from the light exit surface.

18 Claims, 4 Drawing Sheets

BACKLIGHT MODULE AND APPLICATIONS THEREOF

This application claims the benefit of People's Republic of China application Serial No. 201911298543.5, filed Dec. 17, 2019, the subject matter of which is incorporated herein by reference.

BACKGROUND OF THE DISCLOSURE

Field of the Disclosure

The disclosure relates in general to a display apparatus and applications, and more particularly to a backlight module and applications thereof.

Description of the Related Art

With the development of the electrooptical technology, liquid crystal displays (LCDs) are widely used in televisions (TV), monitors, notebook (NB), and personal digital assistant (PDA) and portable electronic devices such as cell phones. However, because the LCDs are not self-emission displays, an external backlight or side light source, such as a backlight module, is need to provide the LCDs high-brightness and high-uniformity lighting for efficiently displaying high-quality images.

A typical backlight module may use phosphors and white light-emitting diodes (LEDs) as backlight sources to provide a white light passing through a color filter to produce red/green/Blue (R/G/B) color lights coming into a liquid crystal display panel for displaying images. In order to reduce the brightness loss of the backlight module, improve the backlight utilization rate and prevent color cross talk of the color filter, a photo-emissive quantum dot structure has been applied to replace the conventional phosphors to convert the wavelength of light coming from the LEDs into a desired color light through a quantum confinement effect that can confine electrons and holes in a nano-sized material to form a self-organized stable state. In comparison with the traditional backlight module applying the phosphors, the LEDs and color filters, the backlight module applying the photo-emissive quantum dot structure has better light utilization efficiency and color saturation luminous characteristics, thereby improving the color gamut of the displayed image.

The traditional method for fabricating a backlight module having a photo-emissive quantum dot structure comprises steps as follows: An entire optical film with a photo-emissive quantum dot structure (for example, a quantum dot enhancement film (QDEF)) is firstly formed by a printing, etching or spraying process; and the optical film is then assembled with a plurality of LEDs to form the backlight module. However, this approach may require a large sheet of the optical film and consume more materials, thus result in high manufacturing costs. To solve this problem, a plurality of quantum dots are directly printed on the surface of a light guide plate (LGP) according to the position of the LEDs disposed in the backlight module. Although this method can reduce the stacking thickness of the optical films to achieve a thinning effect of the backlight module, but it may lead uneven distribution problems of the printed quantum dots. In addition, since the surface temperature of the LGP is higher than that of the optical films, and the quantum dots printed on the LGP may receive more intense light energy, thus the printed quantum dots may be more vulnerable due to the light energy/the heat energy, and may be more likely affected by water vapor. As a result, the service life and reliability of the printed quantum dots may be reduced more severely.

Therefore, there is a need to provide an advanced backlight module and applications thereof to overcome the drawbacks of the prior art.

SUMMARY OF THE DISCLOSURE

One embodiment of the present disclosure is to provide a backlight module, wherein the backlight module includes a light-transmitting shell, a first light-emitting device, a first light conversion layer and an LGP. The light-transmitting shell includes a first top plate and a first sidewall, wherein the first top plate connects to the first sidewall and makes a non-180° angle with the first sidewall, so as to define a first light-mixing space collectively. The first light-emitting device is disposed in the first light-mixing space to provide a first color light. The first light conversion layer is disposed on the first top plate to convert the first color light into a second color light. The LGP has a light incident surface and a light exit surface, the first top plate is disposed between the light incident surface and the first light-emitting device, and the second color light comes into the light guide plate from the light incident surface and is emitted outwards from the light exit surface.

Another embodiment of the present disclosure provides a display apparatus, wherein the display apparatus includes the backlight module as described above and a display medium. The display medium is disposed adjacent to the light exit surface of the LGP of the backlight module.

Yet another embodiment of the present disclosure provides a backlight module, wherein the backlight module includes a light-transmitting shell, a first light-emitting device, a second light-emitting device, a first light conversion layer and an LGP. The light-transmitting shell includes a connecting plate, a first cover body, and a second cover body. The connecting plate connects the bottoms of the first cover body and the second cover body. The first cover body has a first light-mixing space; and the second cover body has a second light-mixing space. The first light-emitting device is disposed in the first light-mixing space to provide a portion of a first color light; the second light-emitting device is disposed in the second light-mixing space to provide another portion of the first color light. The first light-emitting device and the second light-emitting device are fixed on a substrate, and the light-transmitting shell covers the substrate. The first light conversion layer is disposed on the first cover body and the second cover body and is used to convert the first color light to a second color light. The LGP is disposed on the first cover body and the second cover body and has a light incident surface and a light exit surface, and the second color light comes into the light guide plate from the light incident surface and is emitted outwards from the light exit surface.

According to the above embodiments, a backlight module and applications thereof are provided. The backlight module includes a light-transmitting shell formed by a pre-molded transparent plastic sheet. The light-transmitting shell has a cover body including at least one top plate and at least one sidewall connected to the top plate, wherein the top plate and the sidewall form a non-180° angle and collectively define a light-mixing space allowing at least one light-emitting device accommodated therein. A light-transmitting material containing quantum dots is coated on the top plate of the cover body to form a patterned light conversion layer self-aligned with the at least one light-emitting device.

Because the cover body covers the light-emitting device, and the top plate of the cover body directly adjacent to the light incident surface of the LGP. The distance from the light-emitting device to the LGP and the distance from the light-transmitting shell to the LGP can be effectively shortened, and that is helpful for reducing the thickness of the backlight module. In addition, since the self-aligned patterned light conversion layer is used, rather than using an entire quantum dot-enhanced film fully coated with quantum dots, to form the backlight module, thus the processing area, the steps and the material consumption for fabricating the backlight module can be significantly reduced, so as to greatly save the manufacturing cost thereof. The light-transmitting shell and the air gap reserved between the light-transmitting shell and the light-emitting device can buffer the radiant and thermal energy of light coming from the light-emitting device to prevent the light conversion layer from aging and degradation. Thereby the service life and operation reliability of the backlight module can be improved.

BRIEF DESCRIPTION OF THE DRAWINGS

The above and other aspects of the disclosure will become better understood with regard to the following detailed description of the preferred but non-limiting embodiment(s). The following description is made with reference to the accompanying drawings.

DETAILED DESCRIPTION OF THE DISCLOSURE

The present disclosure provides a backlight module and applications thereof to reduce its fabricating cost and improve the serving life and reliabilities of the same. The above and other aspects of the disclosure will become better understood by the following detailed description of the preferred but non-limiting embodiment(s). The following description is made with reference to the accompanying drawings:

Several embodiments of the present disclosure are disclosed below with reference to accompanying drawings. However, the structure and contents disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification.

Figure 1:
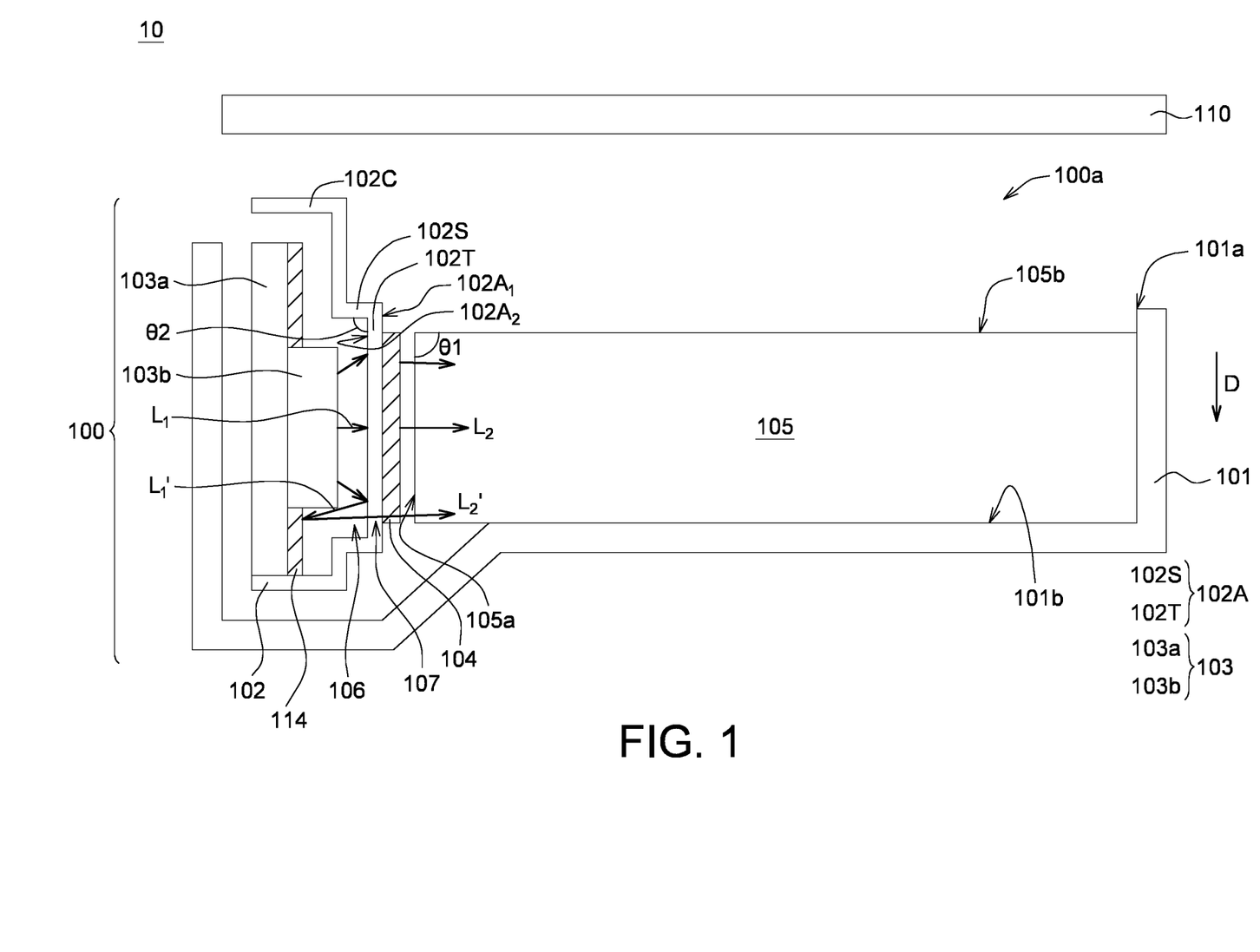
FIG. 1 is a cross-sectional view showing a partial structure of a display apparatus according to an embodiment of the present specification.

FIG. 1 is a cross-sectional view showing a partial structure of a display apparatus 10 according to an embodiment of the present specification. The display apparatus 10 includes a backlight module 100 and a display medium 110 disposed adjacent to the light-emitting surface 100a of the backlight module 100. In some embodiments of the present disclosure, the display medium 110 can be one of an LCD panel, an electronic paper display (EPD) panel and an electronic ink (E-Ink) display panel.

The backlight module 100 may include a back frame 101, a light-transmitting shell 102, at least one first light-emitting device 103, a first light conversion layer 104 and an LGP 105. In some embodiments of the present disclosure, the back frame 101 may be a housing structure with a recess allowing the light-transmitting shell 102, the first light-emitting device 103, the first light conversion layer 104 and the LGP 105 accommodated therein.

The LGP 105 is disposed on the recess bottom 101b of the back frame 101, and has a light incident surface 105a and a light exit surface 105b. In the present embodiment, the light exit surface 105b faces the recess opening 101a of the back plate 101 and serves as a sidewall of the LGP 105 perpendicular to the thickness direction D of the LGP 105. The light incident surface 105a is connected to the light exit surface 105b, and the two collectively form a non-180° angle Θ1. In some embodiments of the present disclosure, the light incident surface 105a is the sidewall parallel to the thickness direction D of the LGP 105 (wherein the non-180° angle Θ1 is equal to 90°); the material made of the LGP 105 may be (but not limited to) glass, polymethylate (PMMA) or other possible light-transmitting materials.

In addition, the light exit surface 105b of the LGP 105 has regularly or irregularly arranged microstructures, such as protrusions, ribs, grooves, openings or recesses (not shown), which can be used to break the total internal reflection of the LGP 105 and enable the light entering the LGP 105 exiting outward from the light exit surface 105b by the reflection or scattering of the microstructures, so as to provide the display medium 110 suitable light for display images.

The light-transmitting shell 102 is disposed on one side of the light guide plate 105. In some embodiments of the present disclosure, the light-transmitting shell 102 may be a three-dimensional (3D) optical film, including a first top plate 102T and at least one first sidewall 102S to collectively define a first light-mixing space 106. In detail, the first top plate 102T is disposed adjacent to the light incident surface 105a of the LGP 105; the first sidewall 102S surrounds and connects the edge of the first top plate 102T; the first sidewall 102S and the first top plate 102T form a non-180° angle Θ2; and the two collectively form a first cover body 102A. The first cover body 102A has an inner surface 102A1 and an outer surface 102A2, wherein the first light-mixing space 106 is defined by the inner surface 102A1 of the first cover body 102A.

In the present embodiment, the light-transmitting shell 102 can be a pre-molding transparent plastic sheet formed by a vacuum forming technology, wherein the vacuum forming technology includes steps as follows: A plastic sheet made of a light-transmitting plastic material (e.g. polyimide (PI), polypropylene (PP), and/or polyethyleneterephthalate (PET)) is softened by heating; the plastic sheet is then stretched and deformed by the air pressure difference or the mechanical pressure occurring on opposite two sides of the plastic sheet and affixed to a specific mold surface; and the stretched/deformed plastic sheet is then shaped by cooling and trimmed to form a shell structure having at least one first light-mixing space 106. However, the material and manufacturing method for fabricating the light-transmitting shell 102 may not be limited to these regards. Any material and method available for pre-molding a transparent plastic sheet can be used to form the light-transmitting shell 102 without departing from the scope of the invention described in the present disclosure.

The first light-emitting device 103 is disposed on one side of the LGP 105, and the light-transmitting shell 102 covers the first light-emitting device 103 to make the first light-emitting device 103 accommodated in the first light-mixing space 106. In some embodiments of the present disclosure, the first light-emitting device 103 may be (but not limited to) an LED device, which includes a substrate 103*a* and at least one LED die 103*b*. For example, the first light-emitting device 103 may be a blue LED module including a blue LED die, or a white light LED module including red/green/blue (R/G/B) three-color LED dies.

In the present embodiment, the LED die 103*b* is disposed on the substrate 103*a* and faces the light incident surface 105*a* of the LGP 105. The first cover body 102A (the inside of which is the first light-mixing space 106) formed by the first sidewall 102S and the first top plate 102T of the light-transmitting shell 102 covers the LED die 103*b*, so as to make the first top plate 102T disposed between the LED die 103*b* and the light incident surface 105*a* of the LGP 105. There is an air gap 107 between the LED die 103*b* and first top plate 102T of the light-transmitting shell 102. In addition to the first cover body 102A formed by the first sidewall 102S and the first top plate 102T, the light-transmitting shell 102 further includes an extension portion 102C connected to the first sidewall 102S of the first cover body 102A and surrounds the substrate 103*a*.

The first light conversion layer 104 is disposed above the first top plate 102T and adjacent to the light incident surface 105*a* of the LGP 105. In some embodiments of the present disclosure, the first light conversion layer 104 may be a single-layer wavelength conversion material layer made of a phosphor (e.g., yttrium aluminum garnet ($Y_3Al_5O_{12}$:Ce)) mixing with various light-transmissive materials (for example, epoxy resin, silicon resin, glass, thermoplastic, etc.), or a multi-layers structure constituted by a plurality of wavelength conversion material layers arranged in a laminated manner.

In some other embodiments of the present disclosure, the first light conversion layer 104 may be a single-layer wavelength conversion material layer formed by quantum dots mixing with various light-transmissive materials (e.g., epoxy resin, silicon resin, glass, thermoplastic, etc.), or a multi-layers structure constituted by a plurality of wavelength conversion material layers arranged in a laminated manner. Wherein the quantum dots are made of nano crystal particles (for example, perovskite crystal particles, $CsPbI_3$ crystal particles, and/or $CsPbBr_3$ crystal particles), semiconductor or other suitable materials.

A portion of a first color light L1 emitted from the LED die 103*b* may be (but not limited to) a blue color light with a wavelength ranging from 200 nm to 500 nm. When the blue color light passes through the air gap 107 and the first top plate 102T of the light-transmitting shell 102 and reaches the first light conversion layer 104, the first color light L1 may be subjected to a wavelength conversion triggered by a quantum confinement effect of the quantum dots in the first light conversion layer 104, and converted into a second color light L2 having a wavelength different from that of the first color light L1. For example, the second color light L2 may be (but not limited to) a white color light; and it may come into the light guide plate 105 from the light incident surface 105*a*, after passing through the first light conversion layer 104.

In some embodiments of the present disclosure, the backlight module 100 further includes a second light conversion layer 114 disposed on the surface of the substrate 103*a* facing the light incident surface 105*a* of the LGP 105. Among them, only a portion of the first color light L1 emitted from the LED 103*b* can directly passes through the first light conversion layer 104 and be converted into the second color light L2. Another portion of the first color light L1' emitted from the LED 103*b* may be reflected to the second light conversion layer 114 by the first top plate 102T of the light-transmitting shell 102, and then converted into a second color light L2' by the quantum dots disposed in the second light conversion layer 114. Subsequently, the second color light L2' are reflected to pass through the air gap 107, the first top plate 102T and the first light conversion layer 104, and then comes into the LGP 105 from the light incident surface 105*a*.

By pre-molding a transparent plastic sheet to form the light-transmitting shell 102 having the first cover body 102A allowing the first light-emitting device 103 accommodated therein, the distance from the light-transmitting shell 102 to the LGP 105 and the distance from the first light-emitting device 103 to the LGP 105 both can be effectively shorten, and that is helpful for reducing the thickness of the backlight module 100. In addition, since a part of the air gap 107 is reserved between the light-transmitting shell 102 and the first light-emitting device 103, thus the light-transmitting shell 102 and the air gap 107 can buffer the radiant and thermal energy of the first color light L1 emitted by the first light-emitting device 103 to prevent the first light conversion layer 104 from aging and degradation. Thereby the service life and operation reliability of the backlight module 100 can be improved.

Figure 2A:
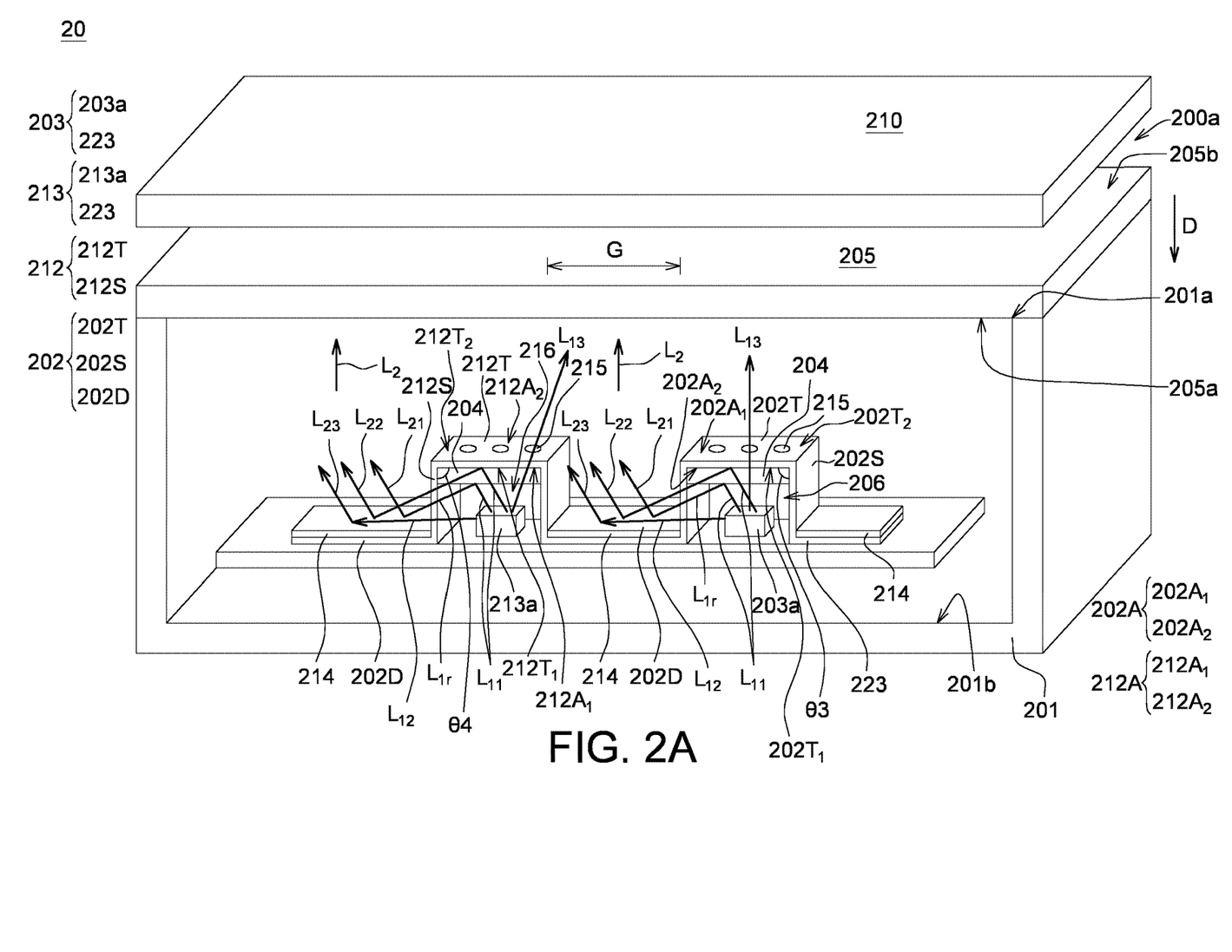
FIG. 2A is a prospective view showing a partial structure of a display apparatus according to another embodiment of the present specification.
Figure 2B:
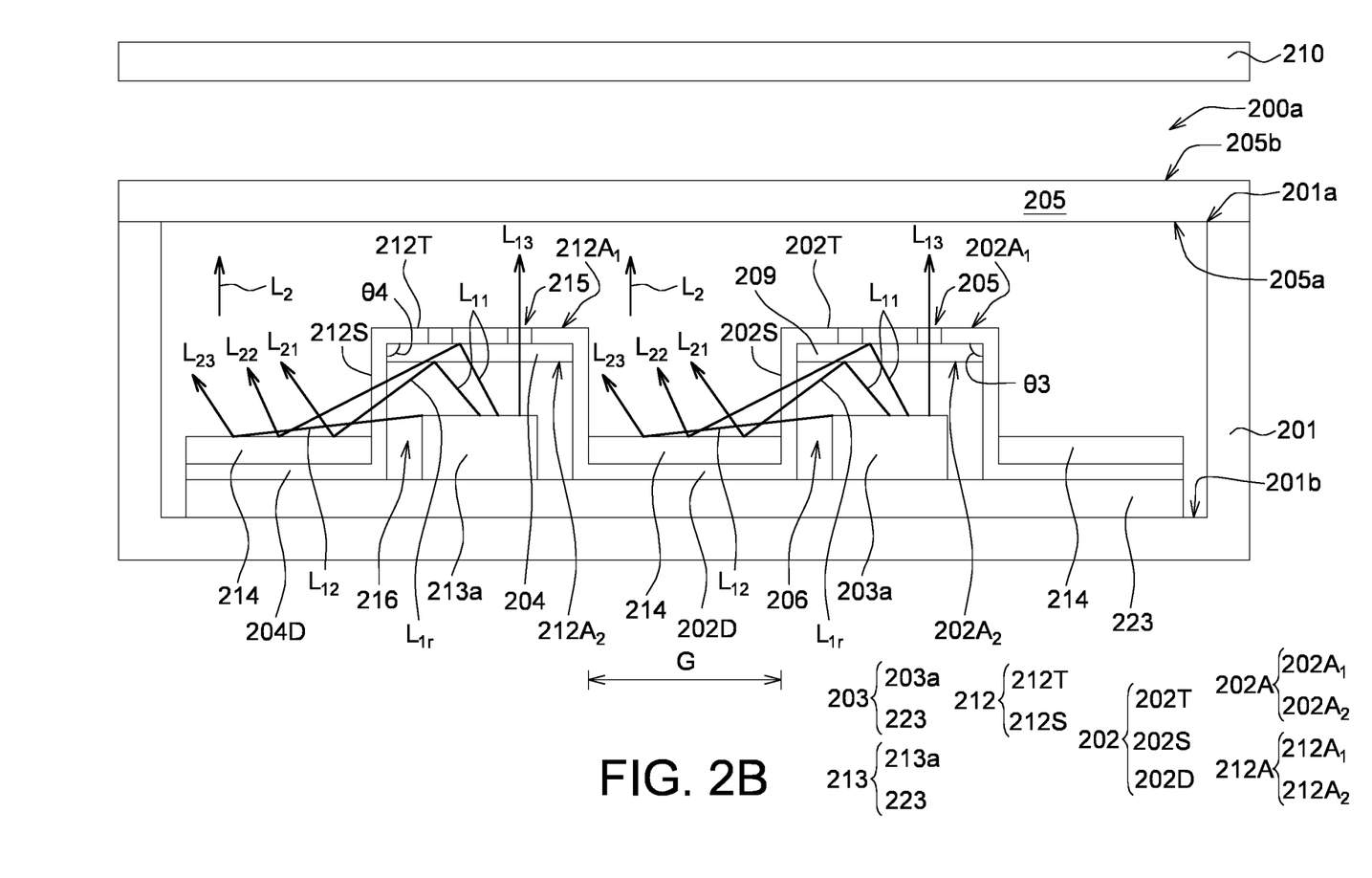
FIG. 2B is a cross-sectional view of the display apparatus as depicted in FIG. 2A.

FIG. 2A is a prospective view showing a partial structure of a display apparatus 20 according to another embodiment of the present specification; and FIG. 2B is a cross-sectional view of the display apparatus 20 as depicted in FIG. 2A. The display apparatus 20 includes a backlight module 200 and a display medium 210 adjacent to the light-emitting surface 200*a* of the backlight module 200. In some embodiments of the present disclosure, the display medium 210 can be one of an LCD panel, an EPD panel and an E-Ink display panel.

The backlight module 200 may include a back frame 201, a light-transmitting shell 202, at least one first light-emitting device 203, a second light-emitting device 213, a first light conversion layer 204, a second light conversion layer 214 and an LGP 205. In some embodiments of the present disclosure, the back frame 201 may be a housing structure with a recess allowing the light-transmitting shell 202, the first light-emitting device 203, the second light-emitting device 213, the first light conversion layer 204, the second light conversion layer 214 and the LGP 205 accommodated therein.

The LGP 205 is disposed between the recess opening 201*a* and the recess bottom 201*b* of the back frame 201; and the LGP 205 has a light incident surface 205*a* and a light exit surface 205*b* opposite to the light incident surface 205*a*. In the present embodiment, the light exit surface 205*b* faces the recess opening 201*a*; and the light incident surface 205*a* and the light exit surface 205*b* are parallel to each other, both are perpendicular to the thickness direction D of the LGP 205, and respectively serve as the top surface and the bottom surface of the LGP 205. In some embodiments of the present disclosure, the material made of the LGP 205 may be (but not limited to) glass, PMMA or other possible light-transmitting materials. In addition, the light exit surface 205*b* of the LGP 205 has regularly or irregularly arranged microstructures, such as protrusions, ribs, grooves, openings or recesses (not shown), which can be used to break the total internal reflection of the LGP 205 and enable the light entering the LGP 205 exiting outward from the light exit surface 205b by the reflection or scattering of the microstructures, so as to provide the display medium 210 suitable light for display images.

The light-transmitting shell 202 is disposed between the light incident surface 205a of the LGP 205 and the recess bottom 201b of the back frame 201. In some embodiments of the present disclosure, the light-transmitting shell 202 may be a 3D optical film, including a first top plate 202T, a second top plate 212T, a first sidewall 202S, a second sidewall 212S and a connecting plate 202D. The first sidewall 202S and the first top plate 202T collectively form a first cover body 202A and define a first light-mixing space 206; the second sidewall 212S and the second top plate 212T collectively form a second cover body 212A and define a second light-mixing space 216; and the connecting plate 202D connects the first cover body 202A and the second cover body 212A.

In detail, the first top plate 202T is disposed adjacent to the light incident surface 205a of the LGP 205. The first sidewall 202S surrounds and connects the edge of the first top plate 202T; the first sidewall 202S and the first top plate 202T form a non-180° angle Θ3; and the two collectively form the first cover body 202A. The second top plate 212T is disposed adjacent to the light incident surface 205a of the LGP 205. The second sidewall 212S surrounds and connects the edge of the second top plate 212T; the second sidewall 212S and the second top plate 212T form a non-180° angle Θ4; and the two collectively form the second cover body 212A.

The first cover body 202A has an inner surface 202A1 and an outer surface 202A2, wherein the first light-mixing space 206 is defined by the inner surface 202A1 of the first cover body 202A. The second cover body 212A has an inner surface 212A1 and an outer surface 212A2, wherein the second light-mixing space 216 is defined by the inner surface 212A1 of the second cover body 212A. The connecting plate 202D connects the bottoms of the first sidewall 202S and the second sidewall 212S, so as to connect the first cover body 202A and the second cover body 202A together, wherein there is a pitch G between the first light mixing space 206 in the first cover body 202A and the second light mixing space 216 in the second cover body 212A.

In the present embodiment, the light-transmitting shell 202 can be a pre-molding transparent plastic sheet formed by a vacuum forming technology, wherein the vacuum forming technology includes steps as follows: A plastic sheet made of a light-transmitting plastic material (e.g. PI, PP, and/or PET) is softened by heating; the plastic sheet is then stretched and deformed by the air pressure difference or the mechanical pressure occurring on opposite two sides of the plastic sheet and affixed to a specific mold surface; and the stretched/deformed plastic sheet is then shaped by cooling and trimmed to form a shell structure.

The first light-emitting device 203 and the second light-emitting device 213 are disposed on a substrate 223, respectively. The substrate 223 is disposed between the LGP 205 and the recess bottom 201b, and the light-transmitting shell 202 covers the first light-emitting device 203, the second light-emitting device 213 and the substrate 223, so as to make the first light-emitting device 203 and the second light emitting device 213 respectively accommodated in the first light-mixing space 206 and the second light-mixing space 216. In some embodiments of the present disclosure, each of the first light-emitting device 203 and the second light-emitting device 213 may be a blue LED module including a blue LED die, or a white light LED module including R/G/B three-color LED dies.

In detail, the first light-emitting device 203 and the second light-emitting device 213 respectively include at least one LED die 203a and 213a disposed above the substrate 223. In the light-transmitting shell 202, the first top plate 202T of the first cover body 202A has a first surface 202T1 and a second surface 202T2; the second top plate 212T of the second cover body 212A has a third surface 212T1 and a fourth surface 212T2. The first surface 202T1 faces the LED die 203a of the first light-emitting device 203; the third surface 212T1 faces the LED die 213a of the second light-emitting device 213; and the LED dies 203a and 213a both face the light incident surface 205a of the LGP 205.

The first cover body 202A (the inside is the first light-mixing space 206) formed by the first sidewall 202S and the first top plate 202T of the light-transmitting shell 202 covers on the LED die 203a, so as to make the first top plate 202T disposed between the LED die 203a and the light incident surface 205a of the LGP 205. The second cover body 212A (the inside is the second light-mixing space 216) formed by the second sidewall 212S and the second top plate 212T of the light-transmitting shell 202 covers on the LED die 213a, so as to make the second top plate 212T disposed between the LED die 213a and the light incident surface 205a of the LGP 205.

The second surface 202T2 of the first top plate 202T of the first cover body 202A and the fourth surface 212T2 of the second top plate 212T of the second cover body 212A are respectively reflective surfaces. The first sidewall 202S of the first cover body 202A and the second sidewall 212S of the second cover body 212A are transparent. Part of the first light conversion layer 204 is disposed on the first surface 202T1 of the first top plate 202T of the first cover body 202A and faces the first light-emitting device 203; another part of the first light conversion layer 204 is disposed on the third top surface 212T1 of the second top plate 212T of the second cover body 212A and faces the second light-emitting device 213. The second light conversion layer 214 is disposed on the connecting plate 202D and faces the light incident surface 205a of the LGP 205.

In some embodiments of the present disclosure, each of the first light conversion layer 204 and the second light conversion layer 214 may be a single-layer wavelength conversion material layer formed by quantum dots mixing with various light-transmissive materials (e.g., epoxy resin, silicon resin, glass, thermoplastic, etc.), or a multi-layers structure constituted by a plurality of wavelength conversion material layers arranged in a laminated manner. Wherein the quantum dots are made of nano crystal particles (for example, perovskite crystal particles, $CsPbI_3$ crystal particles, and/or $CsPbBr_3$ crystal particles), semiconductor or other suitable materials. Both the first light-emitting device 203 and the second light-emitting device 203 emit the first color light L11 (or L12) having the same wavelength range.

In the present embodiment, a portion of the first color light L11 directly coming from the first light-emitting device 203 and the second light-emitting device 213 can be respectively emitted toward the first top plate 202T and the second top plate 212T and reach to two corresponding portions of the first light conversion layer 204 that are respectively disposed on the first surface 202T1 and the third surface 212T1. The portion of the first color light L11 may be subjected to a wavelength conversion triggered by a quantum confinement effect of the quantum dots in the first light conversion layer 204, and converted into a second color light L21. The second color light L21 can be then reflected to pass through the first sidewall 202S and the second sidewall 212S respectively, reaching to the second light conversion layer 214 disposed on the connecting plate 202D.

Of noted that not all of the first color light L11 coming from the first light-emitting device 203 and the second light-emitting device 213 and emitted toward the first top plate 202T and the second top plate 212T can be converted into a second color light L21. A portion of the first color light L11 (referred as the first color light L1r) may be reflected by the first surface 202T1 and the third surface 212T1 to pass through the first sidewall 202S and the second sidewall 212S respectively, reaching to the second light conversion layer 214. The portion of the first color light L1r may be subjected to a wavelength conversion triggered by a quantum confinement effect of the quantum dots in the second light conversion layer 214, and converted into another second color light L22.

Another portion of the first color light L12 directly coming from the first light-emitting device 203 and the second light-emitting device 213 may be directly emitted toward the second light conversion layer 214. The portion of the first color light L12 may be subjected to a wavelength conversion triggered by a quantum confinement effect of the quantum dots in the second light conversion layer 214, and converted into yet another second color light L23. The second color lights L22 and L23 converted by the second light conversion layer 214 are then can be sufficiently mixed with a portion of the second color light L21 being reflected to the second light conversion layer 214 to form a mixed second color light L2. The mixed second color light L2 can then pass through the pitch G between the first light mixing space 206 and the second light mixing spaces 216 and reach to the light incident surface 205a of the LGP 205.

In some embodiments of the present disclosure, the second surface 202T2 of the first cover body 202A and the fourth surface 212T2 of the second cover body 202B that serve as two reflective surfaces may have at least one through-hole 215 allowing another portion of the first color light L13 passing through the second light conversion layer 214, the first top plate 202T and the second top plate 212T to reach the light incident surface 205a of the LGP 205. And the portion of the first color light L13 can be mixed with the mixed second color light L2 to adjust the color of the light emitted from the light-emitting surface 200a of the backlight module 200. The position, size and number of the through-hole 215 can be adjusted according to the actual needs of the display apparatus 20.

By pre-molding a transparent plastic sheet to form the light-transmitting shell 202 having the first cover body 202A and the second cover body 212A respectively allowing the first light-emitting device 203 and the second light-emitting device 213 accommodated therein, the distance from the light-transmitting shell 202 to the LGP 205, the distance from the first light-emitting device 203 to the LGP 205 and the distance from the second light-emitting device 213 to the LGP 205 all can be effectively shorten, and that is helpful for reducing the thickness of the backlight module 200.

In the present embodiment, a patterned first light conversion layer 204 that is made of a light-transmissive material containing quantum dots and coated on the first top plate 202T of the first cover body 202A and the second top plate 212T of the second cover body 212A is applied to perform the wavelength conversion, rather than using a traditional quantum dot-enhanced film that is fully coated with quantum dots to perform the same. Since the patterned first light conversion layer 204 can be self-aligned with the first light-emitting device 203 and the second light-emitting device 213, thus the processing steps and material consumption for fabricating the backlight module 200 can be reduced (in comparison with the traditional approaches), so as to greatly save the manufacturing cost thereof.

In addition, since the first light mixing space 206 and the second light mixing space 216 still reserve air gap between the light-transmitting shell 202 and the first light-emitting device 203 as well as between the light-transmitting shell 202 and the second light-emitting device 213, thus the light-transmitting shell 202 and the air gap can buffer the radiant and thermal energy of the first color light L11 emitted by the first light-emitting device 203 and the second light-emitting device 213 to prevent the first light conversion layer 204 from aging and degradation. Thereby the service life and operation reliability of the backlight module 200 can be improved.

With the configuration of the light-transmitting shell 202, the second light conversion layer 214 can be disposed on the connecting plate 202D connecting the first cover body 202A and the second cover body 212A to convert the portion of the first color light L12 directly coming from the first light-emitting device 203 and the second light-emitting device 213 into the second color light L22, and to convert the portion of the portion of the first color light L1r reflected by the first top plate 202T and the second top plate 212T into the second color light L23. The second color lights L21, L22, and L23 can be sufficiently mixed to obtain the mixed second color light L2 with a higher color saturation, such that the display quality of the display apparatus 20 can be significantly improved.

Figure 3:
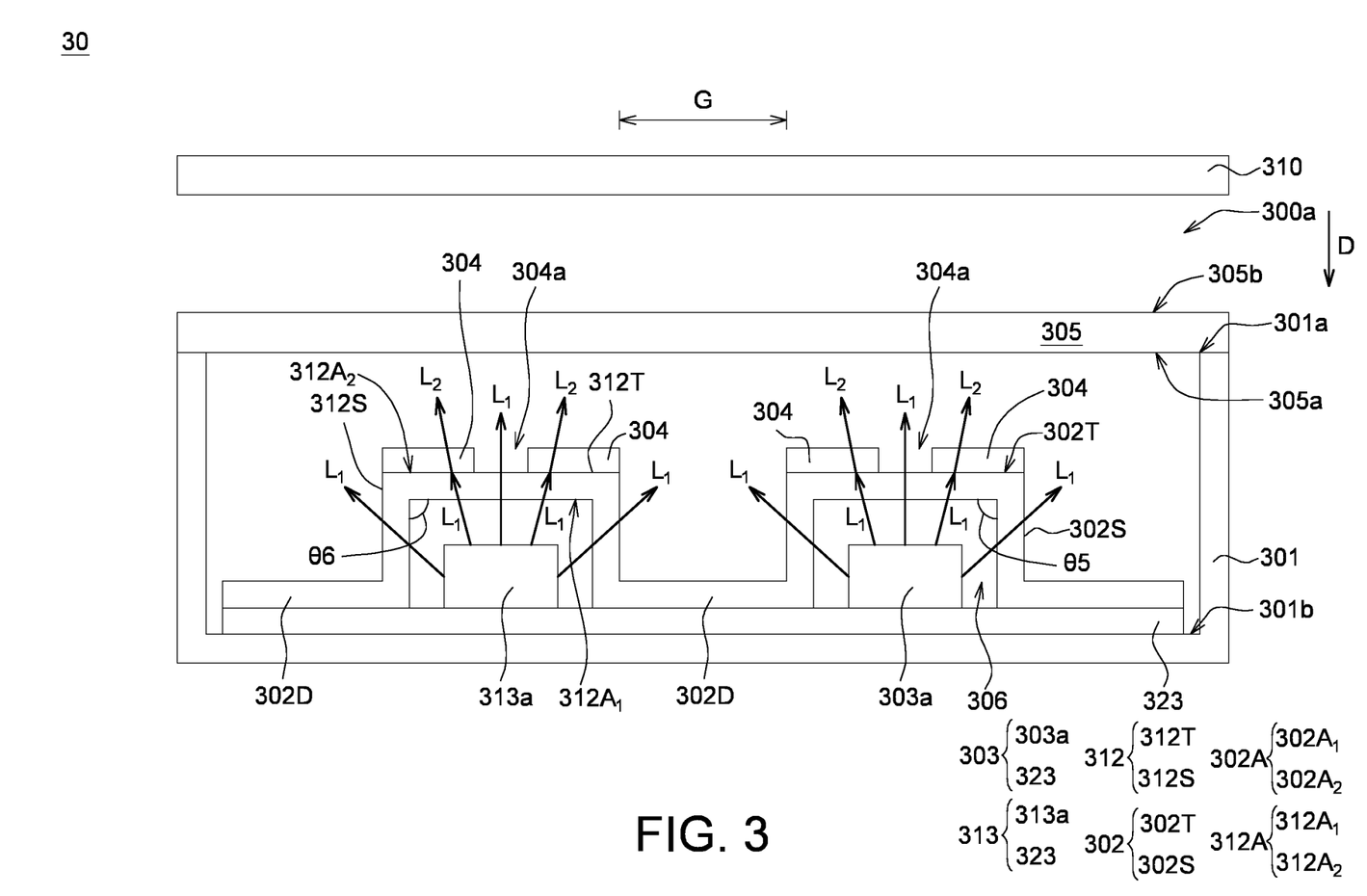
FIG. 3 is a cross-sectional view showing a partial structure of a display apparatus according to yet another embodiment of the present specification.

FIG. 3 is a cross-sectional view showing a partial structure of a display apparatus according to yet another embodiment of the present specification. The display apparatus 30 includes a backlight module 300 and a display medium 310 adjacent to the light-emitting surface 300a of the backlight module 300. In some embodiments of the present disclosure, the display medium 310 can be one of an LCD panel, an EPD panel and an E-Ink display panel.

The backlight module 300 may include a back frame 301, a light-transmitting shell 302, at least one first light-emitting device 303, a second light-emitting device 313, a first light conversion layer 304 and an LGP 305. In some embodiments of the present disclosure, the back frame 301 may be a housing structure with a recess allowing the light-transmitting shell 302, the first light-emitting 303, the second light-emitting device 313, the first light conversion layer 304 and the LGP 305 accommodated therein.

The LGP 305 is disposed between the recess opening 301a and the recess bottom 301b of the back frame 301; and the LGP 305 has a light incident surface 305a and a light exit surface 305b opposite to the light incident surface 305a. In the present embodiment, the light exit surface 305b faces the recess opening 301a; and the light incident surface 305a and the light exit surface 305b are parallel to each other, both are perpendicular to the thickness direction D of the LGP 305, and respectively serve as the top surface and the bottom surface of the LGP 305. In some embodiments of the present disclosure, the material made of the LGP 305 may be (but not limited to) glass, PMMA or other possible light-transmitting materials. In addition, the light exit surface 305b of the LGP 305 has regularly or irregularly arranged microstructures, such as protrusions, ribs, grooves, openings or recesses (not shown), which can be used to break the total internal reflection of the LGP 305 and enable the light entering the LGP 305 exiting outward from the light exit surface 305b by the reflection or scattering of the microstructures, so as to provide the display medium 310 suitable light for display images.

The light-transmitting shell 302 is disposed between the light incident surface 305a of the LGP 305 and the recess bottom 301b of the back frame 301. In some embodiments of the present disclosure, the light-transmitting shell 302 may be a 3D optical film, including a first top plate 302T, a second top plate 312T, a first sidewall 302S, a second sidewall 312S and a connecting plate 302D. The first sidewall 302S and the first top plate 302T collectively form a first cover body 302A and define a first light-mixing space 306; the second sidewall 312S and the second top plate 312T collectively form a second cover body 312A and define a second light-mixing space 316; and the connecting plate 302D connects the first cover body 302A and the second cover body 312A.

In detail, the first top plate 302T is disposed adjacent to the light incident surface 305a of the LGP 305. The first sidewall 302S surrounds and connects the edge of the first top plate 302T; the first sidewall 302S and the first top plate 302T form a non-180° angle Θ5; and the two collectively form the first cover body 302A. The second top plate 312T is disposed adjacent to the light incident surface 305a of the LGP 305. The second sidewall 312S surrounds and connects the edge of the second top plate 312T; the second sidewall 312S and the second top plate 312T form a non-180° angle Θ6; and the two collectively form the second cover body 312A.

The first cover body 302A has an inner surface 302A1 and an outer surface 302A2, wherein the first light-mixing space 306 is defined by the inner surface 302A1 of the first cover body 302A. The second cover body 312A has an inner surface 312A1 and an outer surface 312A2, wherein the second light-mixing space 316 is defined by the inner surface 312A1 of the second cover body 312A. The connecting plate 302D connects the bottoms of the first sidewall 302S and the second sidewall 312S, so as to connect the first cover body 302A and the second cover body 312A together, wherein there is a pitch G between the first light mixing space 306 in the first cover body 302A and the second light mixing spaces 316 in the second cover body 312A.

In the present embodiment, the light-transmitting shell 302 can be a pre-molding transparent plastic sheet formed by a vacuum forming technology, wherein the vacuum forming technology includes steps as follows: A plastic sheet made of a light-transmitting plastic material (e.g. PI, PP, and/or PET) is softened by heating; the plastic sheet is then stretched and deformed by the air pressure difference or the mechanical pressure occurring on opposite two sides of the plastic sheet and affixed to a specific mold surface; and the stretched/deformed plastic sheet is then shaped by cooling and trimmed to form a shell structure.

The first light-emitting device 303 and the second light-emitting device 313 are disposed on a substrate 323, respectively. The substrate 323 is disposed between the LGP 305 and the recess bottom 301b, and the light-transmitting shell 302 covers the first light-emitting device 303, the second light-emitting device 313 and the substrate 323, so as to make the first light-emitting device 303 and the second light emitting device 313 respectively accommodated in the first light-mixing space 306 and the second light-mixing space 316. In some embodiments of the present disclosure, each of the first light-emitting device 303 and the second light-emitting device 313 may be a blue LED module including a blue LED die, or a white light LED module including R/G/B three-color LED dies.

In detail, the first light-emitting device 303 and the second light-emitting device 313 respectively include at least one LED die 303a and 313a disposed above the substrate 323. The first cover body 302A (the inside is the first light-mixing space 306) formed by the first sidewall 302S and the first top plate 302T of the light-transmitting shell 302 covers on the LED 303a, so as to make the first top plate 302T disposed between the LED die 303a and the light incident surface 305a of the LGP 305. The second cover body 312A (the inside is the second light-mixing space 316) formed by the second sidewall 312S and the second first top plate 312T of the light-transmitting shell 302 covers on the LED 313a, so as to make the second top plate 312T disposed between the LED die 313a and the light incident surface 305a of the LGP 305.

The first light conversion layer 304 is disposed between the light-transmitting shell 302 and the light incident surface 305a of the LGP 305. In this embodiment, a part of the first light conversion layer 304 is disposed on the surface of the first top plate 302T of the first cover body 302A facing the light incident surface 305a of the LGP 305; a part of the first light conversion layer 304 is disposed on the surface of the second top plate 312T of the second cover body 312A facing the light incident surface 305a of the LGP 305. The first light conversion layer 304 may be a single-layer wavelength conversion material layer formed by quantum dots mixing with various light-transmissive materials (e.g., epoxy resin, silicon resin, glass, thermoplastic, etc.), or a multi-layers structure constituted by a plurality of wavelength conversion material layers arranged in a laminated manner. Wherein the quantum dots are made of nano crystal particles (for example, perovskite crystal particles, $CsPbI_3$ crystal particles, and/or $CsPbBr_3$ crystal particles), semiconductor or other suitable materials.

A portion of the first color light L1 coming from the first light-emitting device 303 and the second light-emitting device 313 may pass through the first light conversion layer 304 to be converted into a second color light L2; and another portion of the first color light L1 may pass through the first sidewall 302S and the second sidewall 312S reaching to the light incident surface 305a of the LGP 305. In some embodiments of the present disclosure, the first light conversion layer 304 may have at least one through-hole 304a allowing yet another portion of the first color light L1 directly passing through the first top plate 302T of the first cover body 302A and the second top plate 312T of the second cover body 312A to reach the light incident surface 305a of the LGP 305. And these portions of the first color light L1 passing through the light-transmitting shell 302 can be mixed with the second color light L2 to adjust the color of the light emitted from the light-emitting surface 300a of the backlight module 300. The position, size and number of the through-hole 304a can be adjusted according to the actual needs of the display apparatus 30.

By pre-molding a transparent plastic sheet to form the light-transmitting shell 302 having the first cover body 302A and the second cover body 312A respectively allowing the first light-emitting device 303 and the second light-emitting device 313 accommodated therein, the distance from the light-transmitting shell 302 to the LGP 305, the distance from the first light-emitting device 303 to the LGP 305 and the distance from the second light-emitting device 313 to the LGP 305 all can be effectively shorten, and that is helpful for reducing the thickness of the backlight module 300.

In the present embodiment, a patterned first light conversion layer 304 that is made of a light-transmissive material containing quantum dots and coated on the first top plate 302T of the first cover body 302A and the second top plate 312T of the second cover body 312A is applied to perform the wavelength conversion, rather than using a traditional quantum dot-enhanced film that is fully coated with quantum dots to perform the same. Since the patterned first light conversion layer 304 can be self-aligned with the first light-emitting device 303 and the second light-emitting device 313, thus the processing steps and material consumption for fabricating the backlight module 300 can be reduced (in comparison with the traditional approaches), so as to greatly save the manufacturing cost thereof.

In addition, since the first light mixing space 306 and the second light mixing space 316 still reserve air gap between the light-transmitting shell 302 and the first light-emitting device 303 as well as between the light-transmitting shell 302 and the second light-emitting device 313, thus the light-transmitting shell 302 and the air gap can buffer the radiant and thermal energy of the first color light L1 emitted by the first light-emitting device 303 and the second light-emitting device 313 to prevent the first light conversion layer 304 from aging and degradation. Thereby the service life and operation reliability of the backlight module 300 can be improved.

According to the above embodiments, a backlight module and applications thereof are provided. The backlight module includes a light-transmitting shell formed by a pre-molded transparent plastic sheet. The light-transmitting shell has a cover body including at least one top plate and at least one sidewall connected to the top plate, wherein the top plate and the sidewall form a non-180° angle and collectively define a light-mixing space allowing at least one light-emitting device accommodated therein. A light-transmitting material containing quantum dots is coated on the top plate of the cover body to form a patterned light conversion layer self-aligned with the at least one light-emitting device.

Because the cover body covers the light-emitting device, and the top plate of the cover body directly adjacent to the light incident surface of the LGP. The distance from the light-emitting device to the LGP and the distance from the light-transmitting shell to the LGP can be effectively shortened, and that is helpful for reducing the thickness of the backlight module. In addition, since the self-aligned patterned light conversion layer is used, rather than using an entire quantum dot-enhanced film fully coated with quantum dots, to form the backlight module, thus the processing area, the steps and the material consumption for fabricating the backlight module can be significantly reduced, so as to greatly save the manufacturing cost thereof. The light-transmitting shell and the air gap reserved between the light-transmitting shell and the light-emitting device can buffer the radiant and thermal energy of light coming from the light-emitting device to prevent the light conversion layer from aging and degradation. Thereby the service life and operation reliability of the backlight module can be improved.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A backlight module, comprises:
   a light-transmitting shell, including a first top plate and a first sidewall, wherein the first top plate connects to the first sidewall and makes a non-180° angle with the first sidewall, so as to define a first light-mixing space collectively;
   a first light-emitting device, disposed in the first light-mixing space to provide a first color light;
   a first light conversion layer, disposed on the first top plate to convert the first color light into a second color light; and
   an light guide plate (LGP), having a light incident surface and a light exit surface, wherein the first top plate is disposed between the light incident surface and the first light-emitting device; and the second color light comes into the light guide plate from the light incident surface and is emitted outwards from the light exit surface;
   wherein the first light conversion layer has at least one through-hole allowing a portion of the first color light directly passing there through, and then passing the light-transmitting shell to reach the light incident surface.

2. The backlight module according to claim 1, wherein the first sidewall surrounds and connects an edge of the first top plate to form a first cover body covering the first light-emitting device; the first cover body has an inner surface and an outer surface; and the first light-mixing space is defined by the inner surface of the first cover body.

3. The backlight module according to claim 2, wherein the light incident surface is connected to the light exit surface and collectively forming a non-180° angle; and the first light conversion layer is disposed between the first cover body and the light incident surface.

4. The backlight module according to claim 3, wherein the first light-emitting device is disposed on a substrate on which a second light conversion layer is disposed; a portion of the first color light passes through the first light conversion layer and is converted into a portion of the second color light; and another portion of the first color light is reflected to the second light conversion layer by the first top plate and converted into another portion of the second color light.

5. The backlight module according to claim 2, wherein the light incident surface is parallel to the light exit surface; the backlight module further comprises a second light-emitting device; the light-transmitting shell further comprises a connecting plate, a second sidewall and a second top plate; the second sidewall surrounds and connects an edge of the second top plate to form a second cover body; the second cover body has an inner surface to define a second light-mixing space; the second light-emitting device is accommodated in the second light-mixing space to contribute the first color light; the connecting plate connects bottoms of the first sidewall and the second sidewall; and a portion of the first light conversion layer is disposed on the second top plate.

6. The backlight module according to claim 5, wherein the first light conversion layer is disposed between the light-transmitting shell and the light incident surface; and at least a portion of the first color light passes through the first light conversion layer to be converted into a portion of the second color light.

7. The backlight module according to claim 5, wherein the first top plate has a first surface and a second surface; the second top plate has a third surface and a fourth surface; the first surface faces the first light-emitting device; the third surface faces the second light-emitting device; the first light conversion layer is disposed on the first surface and the third surface; and a portion of the first color light is reflected by the first light conversion layer and converted into a portion of the second color light.

8. The backlight module according to claim 7, further comprising a second light conversion layer disposed on the connecting plate and facing the light incident surface, wherein a portion of the first color light coming from the first light-emitting device and the second light-emitting device and another portion of the first color light reflected by the first surface and the third surface both reach to the second light conversion layer to be reflection and converted into a portion of the second color light by the second light conversion layer.

9. The backlight module according to claim 7, wherein the second surface and the fourth surface serve as two reflective surfaces.

10. The backlight module according to claim 9, wherein the first sidewall and the second sidewall are transparent; the reflective surfaces have at least one through-hole; and there is a pitch between the first light mixing space and the second light mixing space.

11. The backlight module according to claim 1, wherein the first sidewall surrounds and connects an edge of the first top plate to form a first cover body covering the first light-emitting device; the first cover body has an inner surface and an outer surface; and the first light conversion layer is disposed on the inner surface.

12. The backlight module according to claim 1, wherein the first light conversion layer is made of a phosphor mixing with light-transmissive materials or a multi-layers structure constituted by a plurality of wavelength conversion material layers arranged in a laminated manner.

13. The backlight module according to claim 1, wherein the first color light has a wavelength ranging from 200 nm to 500 nm; and the second color light is a white light.

14. A display apparatus, comprising:
a backlight module according to claim 1; and
a display medium disposed adjacent to the light exit surface.

15. A backlight module, comprises:
a light-transmitting shell, including a connecting plate, a first cover body, and a second cover body, wherein the connecting plate connects bottoms of the first cover body and the second cover body; the first cover body has a first light-mixing space; and the second cover body has a second light-mixing space;
a first light-emitting device, disposed in the first light-mixing space to provide a portion of a first color light;
a second light-emitting device, disposed in the second light-mixing space to provide another portion of the first color light, wherein the first light-emitting device and the second light-emitting device are fixed on a substrate, and the light-transmitting shell covers the substrate;
a first light conversion layer, disposed on the first cover body and the second cover body and used to convert the first color light to a second color light; and
an LGP, having a light incident surface and a light exit surface and disposed on the first cover body and the second cover body, wherein the second color light comes into the light guide plate from the light incident surface and is emitted outwards from the light exit surface;
wherein the first light conversion layer has at least one through-hole allowing a portion of the first color light directly passing there through, and then passing the light-transmitting shell to reach the light incident surface.

16. The backlight module according to claim 15, wherein the first cover body has a first surface and a second surface; the second cover body has a third surface and a fourth surface; the first surface faces the first light-emitting device; the third surface faces the second light-emitting device; the second surface and the fourth surface face the light incident surface; the first light conversion layer is disposed on the first surface and the third surface; and a portion of the first color light is reflected by the first light conversion layer and converted into a portion of the second color light.

17. The backlight module according to claim 16, further comprising a second light conversion layer disposed on the connecting plate and facing the light incident surface, wherein a portion of the first color light coming from the first light-emitting device and the second light-emitting device and another portion of the first color light reflected by the first surface and the third surface both reach to the second light conversion layer to be reflection and converted into a portion of the second color light by the second light conversion layer.

18. The backlight module according to claim 15, wherein the first cover body has a first sidewall and a first top plate; the two collectively form a non-180° angle; and the first sidewall is transparent.

* * * * *